(12) United States Patent
Kurzenberger et al.

(10) Patent No.: US 9,016,246 B2
(45) Date of Patent: Apr. 28, 2015

(54) PORTABLE HANDHELD WORK APPARATUS HAVING AN INTERNAL COMBUSTION ENGINE

(75) Inventors: Jan Kurzenberger, Köngen (DE); Thorsten Hecht, Dürbheim (DE); Sebastian Hänssler, Stuttgart (DE); Stefan Kummermehr, Berglen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 205 days.

(21) Appl. No.: 13/458,756

(22) Filed: Apr. 27, 2012

(65) Prior Publication Data

US 2012/0291725 A1 Nov. 22, 2012

Related U.S. Application Data

(63) Continuation-in-part of application No. 12/658,399, filed on Feb. 9, 2010, now abandoned.

(30) Foreign Application Priority Data

Feb. 9, 2009 (DE) .......................... 10 2009 008 055

(51) Int. Cl.
*F01P 1/02* (2006.01)
*F02M 31/14* (2006.01)
(Continued)

(52) U.S. Cl.
CPC ................ *F02M 31/145* (2013.01); *F01P 1/02* (2013.01); *F01P 2001/026* (2013.01); *F01P 1/06* (2013.01); *F01P 2060/10* (2013.01); *F02B 63/02* (2013.01); *F02F 1/30* (2013.01); *F02F 1/34* (2013.01); *F02M 15/02* (2013.01); *F02M 35/1017* (2013.01); *F02M 35/1019* (2013.01); *F02M 35/10268* (2013.01); *Y02T 10/126* (2013.01)

(58) Field of Classification Search
CPC ................ F01P 5/06; F01P 1/00; F01P 1/02; F01P 1/04; F01P 1/06; F01P 1/08; F01P 1/10; F01P 7/00; F01P 2001/00; F01P 2001/023; F01P 2001/026
USPC ....................................................... 123/41.65
See application file for complete search history.

(56) References Cited

U.S. PATENT DOCUMENTS 3,581,717 A 6/1971 Fullerton
4,787,924 A 11/1988 Nagashima et al.
(Continued)

*Primary Examiner* — Lindsay Low
*Assistant Examiner* — Jacob Amick
(74) *Attorney, Agent, or Firm* — Walter Ottesen P.A.

(57) ABSTRACT

In an internal combustion engine (2) of a portable handheld work apparatus, the cylinder (3) is provided with cooling ribs (4, 4'). A cooling airflow is generated by the fan wheel (13) and is guided over the cooling ribs. A carburetor (9) is temperaturized as required by the heated cooling air. A control of the cooling airflow to the carburetor (9) takes place in that an opening (11), which passes the heated cooling air, is selectively closed or opened via a closure element (12). In order to obtain improved cooling of the cylinder during summer operation as well as during winter operation, the closure element (12) is provided with at least one air guide wall which extends essentially transversely to the cooling airflow and causes this cooling air to be partially backed up and deflected.

19 Claims, 8 Drawing Sheets

(51) Int. Cl.
*F01P 1/06* (2006.01)
*F02B 63/02* (2006.01)
*F02F 1/30* (2006.01)
*F02F 1/34* (2006.01)
*F02M 15/02* (2006.01)
*F02M 35/10* (2006.01)

(56) References Cited

U.S. PATENT DOCUMENTS 5,438,965 A 8/1995 Aronsson et al.
6,807,954 B2 * 10/2004 Nara et al. .................... 123/556

* cited by examiner

PORTABLE HANDHELD WORK APPARATUS HAVING AN INTERNAL COMBUSTION ENGINE

CROSS REFERENCE TO RELATED APPLICATIONS

This is a continuation-in-part application of U.S. patent application Ser. No. 12/658,399, filed Feb. 9, 2010, now abandoned, and claims priority of German patent application no. 10 2009 008 055.4, filed Feb. 9, 2009, and the entire contents of both are incorporated herein by reference.

BACKGROUND OF THE INVENTION

U.S. Pat. No. 4,787,924 discloses a portable handheld work apparatus having an internal combustion engine wherein means are provided for setting a summer operation and a winter operation. The carburetor is mounted in a compartment covered by a filter element and two separate air inlet openings are provided for the inflow of combustion air. These inlet openings can be alternately opened or closed by a blocking wall. During summer operation, the blocking wall is so positioned that it closes an opening connecting the engine compartment to the carburetor compartment and clears an opening connected to the outside of the apparatus housing so that external air is supplied to the carburetor as combustion air. During winter operation, the opening to the outside is closed and the opening to the engine compartment is open so that air, which is heated by the cooling ribs of the engine, is supplied to the carburetor as combustion air. This publication is silent as to the cooling of the cylinder and the guidance of the cooling airflow at the cooling ribs.

SUMMARY OF THE INVENTION

It is an object of the invention to provide a portable handheld work apparatus of the kind described above wherein an improved cooling of the cylinder is achieved during summer operation and winter operation.

The portable handheld work apparatus of the invention includes: an internal combustion engine having a cylinder provided with cooling ribs; a carburetor operatively connected to the engine; a fan wheel for generating a cooling airflow passing over the cooling ribs causing the cooling airflow to become a heated cooling airflow; an opening passing the heated cooling airflow to the carburetor for temperaturizing the carburetor as may be needed; a closure element for selectively opening or closing the opening for controlling the heated cooling airflow to the carburetor; the closure element having an air guide wall extending substantially transversely to the heated cooling airflow so as to cause the heated cooling airflow to be at least in part backed up and deflected; and, the closure element being configured to be in a selectable position so as to cause the heated cooling airflow to be split into a first component of heated cooling airflow to the carburetor and a second component of heated cooling airflow toward the cooling ribs.

The arrangement of at least one air guide wall on the closure element achieves the condition that at least a component airflow is directed onto a side of the cylinder facing away from the fan wheel and, in this way, a uniform cooling over the periphery of the cylinder is provided. A further advantage is that the disassembly and the insertion of the closure element is facilitated by the manipulation thereof at the air guide wall. The closure element is so configured that, in a selectable position, the cooling air is divided into a component airflow to the carburetor and into a component airflow for charging the cooling ribs. In this way, an adequate warming of the carburetor is provided as well as an adequate cooling of the cylinder on the side thereof facing away from the fan wheel.

A suitable configuration comprises that an intermediate wall is formed in a housing of the work apparatus. This intermediate wall partitions an engine compartment from a carburetor compartment. The opening for permitting the heated cooling air to pass through to the carburetor is provided in the intermediate wall. The direct passing of the heated air into the carburetor compartment is made possible in this way and additional air guiding channels are not needed:

According to a first embodiment, the closure element is advantageously configured as an insert component. In this way, the assembly is especially easily possible and no additional fastening elements such as threaded fasteners, clamps or the like are needed. The insert component is configured to be elongated and has a center or mid section for selectively closing the opening and insert sections for attaching the insert component. Take-up fixtures are provided close to the opening into which the insert component can be inserted. These take-up fixtures each preferably include a slot wherein the insert sections are accommodated.

In order to avoid an unintended loosening of the insert component from the assumed position, it is advantageous that at least one latch projection is formed on the insert component which coacts with a latch hook held on the intermediate wall. According to a preferred embodiment of the invention, the insert component has an air guide wall on a longitudinal side thereof which extends essentially over the length of the insert component. This element is especially provided for summer operation. For the winter operation, it is advantageous that the insert component, on a longitudinal side, has a channel for conducting air of the component airflow to the carburetor. The channel is in overlapment with the opening in the mounted or installed position of the insert component. On this longitudinal side, it is practical to arrange a short air conducting wall next to the channel.

According to a second advantageous embodiment of the invention, the closure element comprises two parts, namely, a fixed or stationary socket and a movable slider. This slider is limitedly linearly movable on the socket. This embodiment of the closure element with the movable slider affords the advantage that the closure element does not have to be removed for changing over from one position into the other. In a further embodiment, it is provided that a channel is configured in the socket which can be cleared or can be blocked by means of the slider. For blocking or clearing the channel, a blocking section is formed on the slider. On the socket, attachment hooks and lateral rails are arranged via which the socket is attached to the intermediate wall. For the simple manipulation of the slider, the slider is provided with a handle for shifting. Furthermore, it is an advantage that the socket has two elongated recesses wherein a projection of the slider can latch so that the slider is held in a defined position. The socket and the slider are preferably made of plastic.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
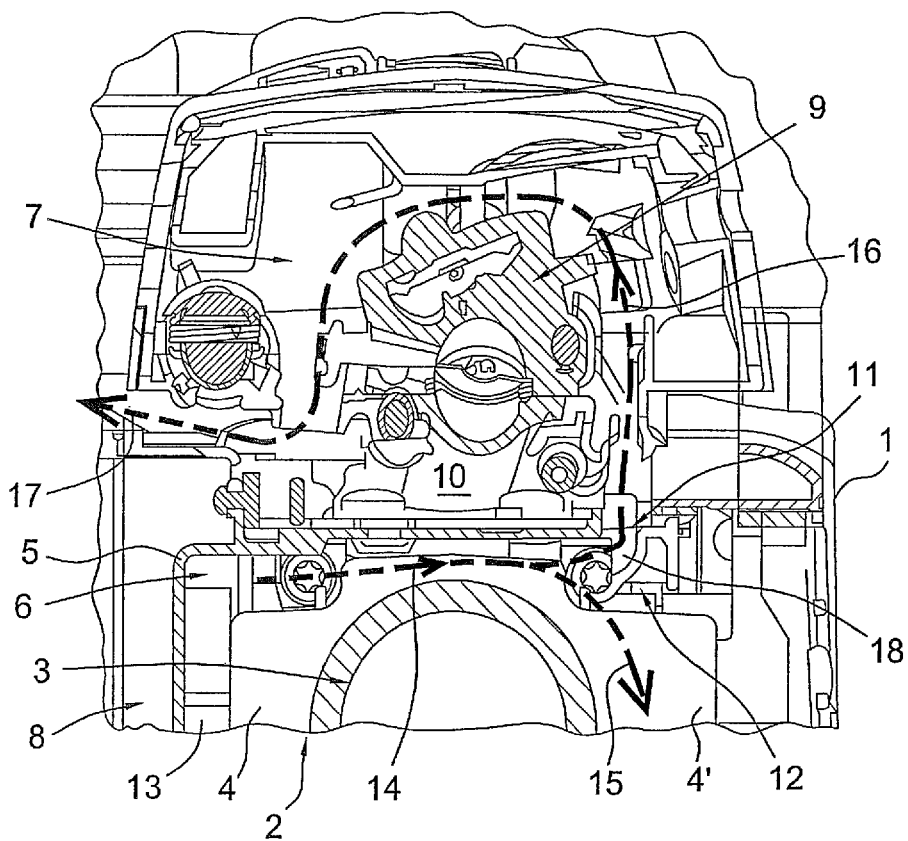
FIG. 1 is a cutaway view of a section through an internal combustion engine having a carburetor introduced into a housing.

The section shown in FIG. 1 illustrates an internal combustion engine 2 having a cylinder 3 and with cooling ribs 4 formed on the cylinder. The engine 2 is built into a housing 1 of a portable handheld work apparatus. In the housing 1, an intermediate wall 5 extends next to the engine 2 and this wall partitions an engine compartment 6 from a carburetor compartment 7, a tank compartment 8 and, if needed, additional compartments. A carburetor 9 is arranged in the carburetor compartment 7. The carburetor 9 is connected by an intake stub 10 to an inlet opening (not shown in FIG. 1) for the combustion mixture.

An opening 11 is disposed in the intermediate wall 5 and a closure element 12 is arranged in the region of this opening. The closure element 12 can assume two different positions on the intermediate wall 5. In a first position, the opening 11 is cleared and, in a second position, the opening 11 is closed. The position with the cleared opening 11 is the "winter position" and the position with the closed opening 11 is the "summer position". In FIG. 1, the winter position of the closure element 12 is shown and, accordingly, the opening 11 is cleared. In this way, the engine compartment 6 is connected to the carburetor compartment 7.

A cooling airflow 14 is generated by a fan wheel 13 attached to the engine shaft. The cooling airflow 14 charges the cooling ribs 4 of the engine and flows between the cylinder 3 and the intermediate wall 5. The cooling airflow 14 is heated by radiation of heat at the cooling ribs 4 and impinges upon the closure element 12. A component flow 16 is conducted to opening 11 via a channel 18 configured in the closure element 12 and is guided into the carburetor compartment 7. There, this component flow 16 of the heated cooling air flows about the housing of the carburetor 9 so that a temperature increase results and the combustion air, which flows through the carburetor 9, is likewise heated. The component flow 16 exits from the carburetor compartment 7 in accordance with arrow 17. A portion of this cooling airflow 14 backs up at an air conducting wall when striking the closure piece 12 and a component airflow 15 is deflected into the direction which makes possible a charging of the cooling ribs 4' facing away from the fan wheel 13. The air guide wall will be explained in greater detail hereinafter. In this way, a uniform temperature distribution over the periphery of the cylinder 3 is achieved.

Figure 2:
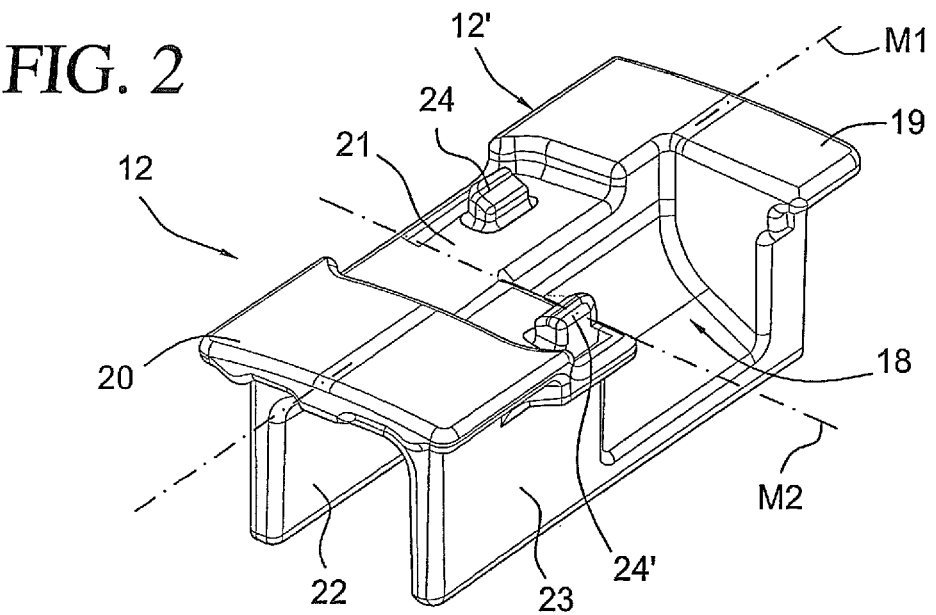
FIG. 2 shows a closure element configured as an insert component for influencing an airflow path.

FIG. 2 shows a perspective view of the closure element 12 which is configured as insert component 12' in the embodiment. The closure element 12 has a center axis M1 in its longitudinal direction and a center axis M2 in its transverse direction. On its upper side in FIG. 2, the insert component 12' is provided with insert sections (19, 20) which are disposed on the narrow sides of the insert component 12' and are somewhat elevated relative to a center section 21 of the insert component. Referred to the center axis M1, an air guide wall 22 runs on the longitudinal side of the insert component 12' over the length between the insert sections (19, 20) and the channel 18 is configured on the other longitudinal side between the insert section 19 and the center axis M2 of the transverse direction and a short air guide wall 23 is arranged between the insert section 20 and the center axis M2. The air guide wall 23 runs parallel to the air guide wall 22 disposed on the other longitudinal side.

On the center section 21, two upwardly-directed latch projections (24, 24') are provided which, referred to the center axes (M1, M2), are arranged at mirror images with respect to each other and, as will be explained hereinafter, function to ensure that the insert component 12' remains securely in its mounted position.

Figure 3:
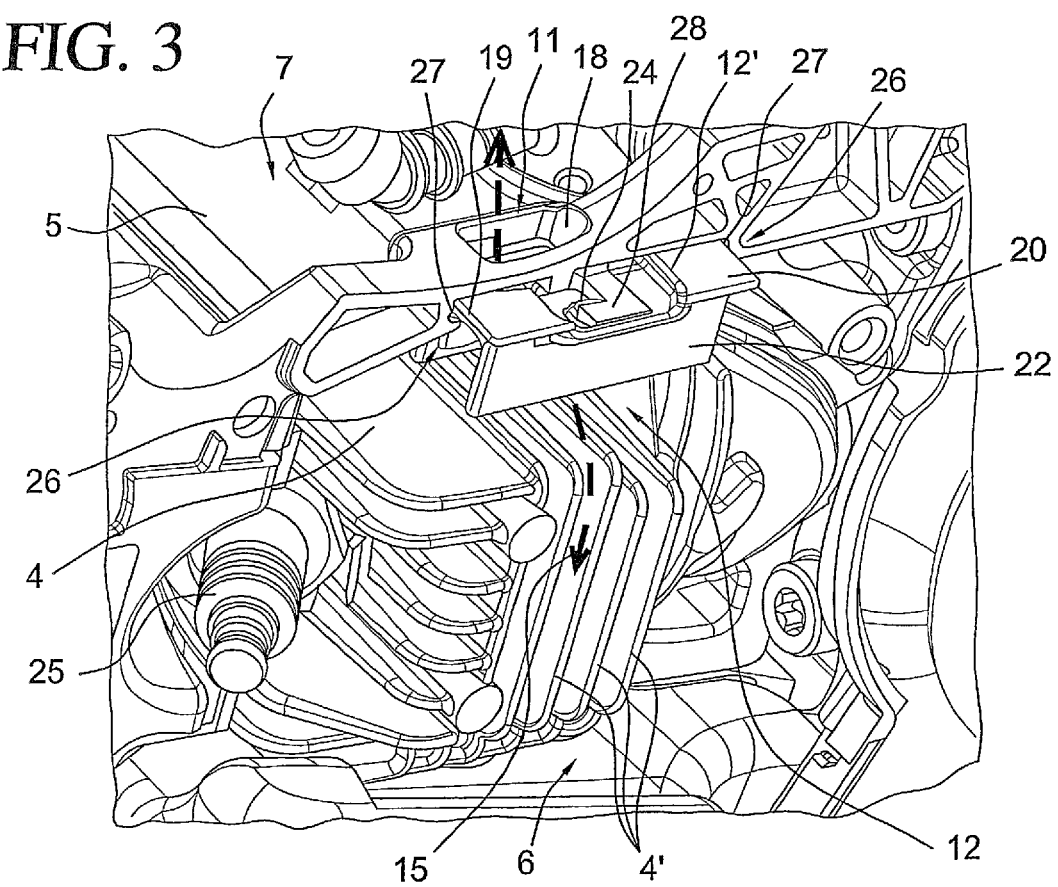
FIG. 3 is a cutaway detail view of the internal combustion engine and the insert component disposed in a first position.

FIG. 3 shows a cutaway detail of a view of the internal combustion engine 2 having cooling ribs 4' and a spark plug 25. The intermediate wall 5 is disposed above the engine 2 and partitions the engine compartment 6 from the carburetor compartment 7. The opening 11 is provided in the intermediate wall and this opening connects the engine compartment 6 to the carburetor compartment 7. In the region of the opening 11, receiving fixtures 26 are formed laterally next to the opening and these fixtures form opposite-lying slots 27 running parallel to the plane of the intermediate wall. The insert sections (19, 20) of the closure element 12 can be pushed into these slots 27 and, so far, until a latch hook 28 latches in behind the latch projection 24 and in this way reliably fixes the insert component 12'.

In the first position shown in FIG. 3 wherein the insert component 12' is installed, the opening 11 is cleared in that the channel 18 is disposed in overlapment with the opening 11 and therefore the component flow 16 of the cooling airflow is conducted through the opening 11 into the carburetor compartment 7. The other component flow 15 is deflected by the short guide wall 23 (not shown in FIG. 3) to the cooling ribs 4.

Figure 4:
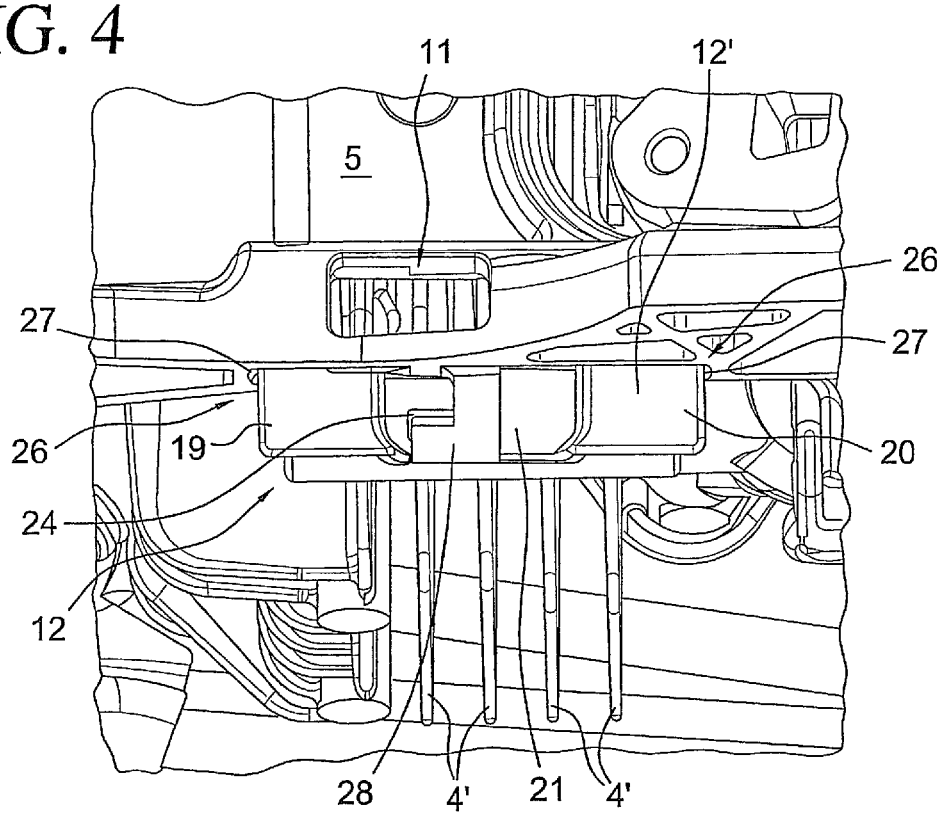
FIG. 4 is an alternate view onto the insert component in the installed position of FIG. 3.

FIG. 4 shows another view of the closure element 12 or insert component 12' in the installed position in accordance with FIG. 3. The insert component 12' is introduced with its insert sections (19, 20) into slots 27 of the receiving fixtures 26. The insert component 12' is inserted so far that the latch hook 28 engages behind the latch projection 24. The reference numerals correspond to those in FIG. 3 for the same parts.

Figure 5:
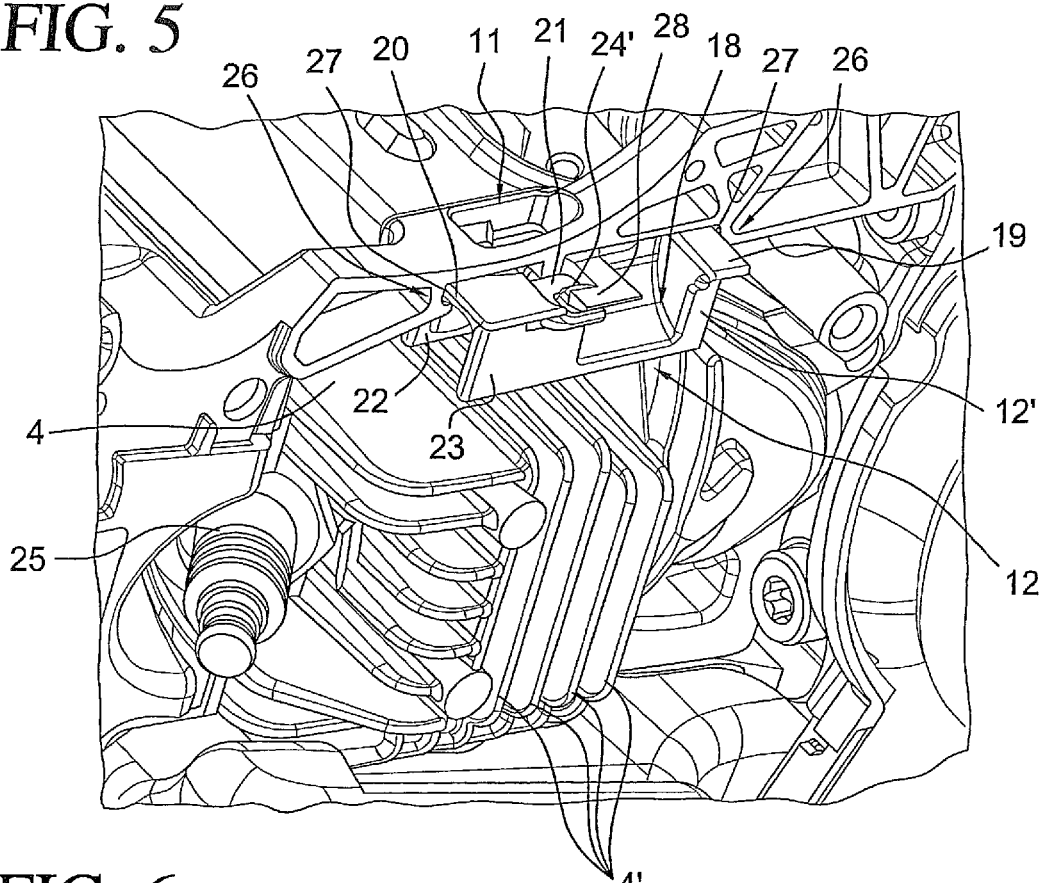
FIG. 5 is a detail view of FIG. 3 but with the insert component disposed in a second position.

FIG. 5 shows a cutaway of a view of the engine 1 according to FIG. 3 but with a second position of the closure element 12 or insert component 12'. The insert component 12' is pushed into the slots 27 of the receiving fixture 26 such that the air guide wall 22 faces toward the cooling airflow and the closure element 12 closes the opening 11. The channel 18 and the short air guide wall 23 are disposed on the side facing away from the cooling airflow and are therefore not functioning. In this installed position of the insert component 12', the cooling airflow is almost completely deflected in the direction toward the cooling ribs 4' and there is no dividing into the component flows described above. To secure the insert component 12', the latch hook 28 grabs behind the latch projection 24'. The reference numerals in FIG. 5 correspond to those of FIG. 3 for the same parts.

Figure 6:
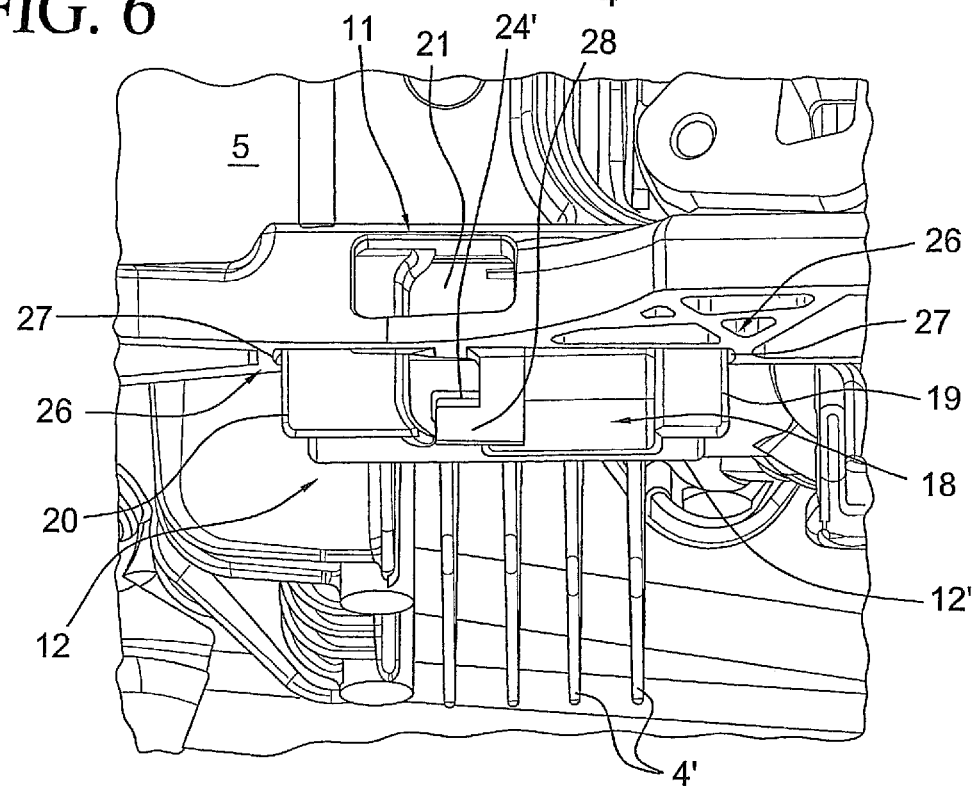
FIG. 6 is an alternate view of the insert component in the installed position of FIG. 5.

FIG. 6 shows another view of the closure element 12 or insert component 12' in the installed position according to FIG. 5. Compared to the first installed position shown in FIG. 4, the insert component 12' is inserted into the slots 27 rotated 180° so that the insert component 12' completely covers the opening 11 with the center section 21 and the bordering region directed toward the insert or end section 20 and thereby completely closes this opening 11. In this second installed position, the latch projection 24 is grabbed from behind by the latch hook 28 and, in this way, the insert component 12' is fixed in its position. The parts of FIG. 6 which are the same as those in FIG. 5 have the same reference numerals.

To remove the closure element 12 or insert component 12', the latch hook 28 is lifted and the insert component is pulled out of the slots 27 of the receiving fixture 26. For this purpose, the insert component 12' can be grabbed in a simple manner at one of the air guide walls (22, 23) or at both air guide walls which facilitates manipulation. To insert the insert component 12' into the other position, the component is rotated by 180° and is then pushed into the slots 27 with the insert sections (19, 20) so far until the latch hook 28 latches behind the corresponding latch projection 24 or 24'.

Figure 7:
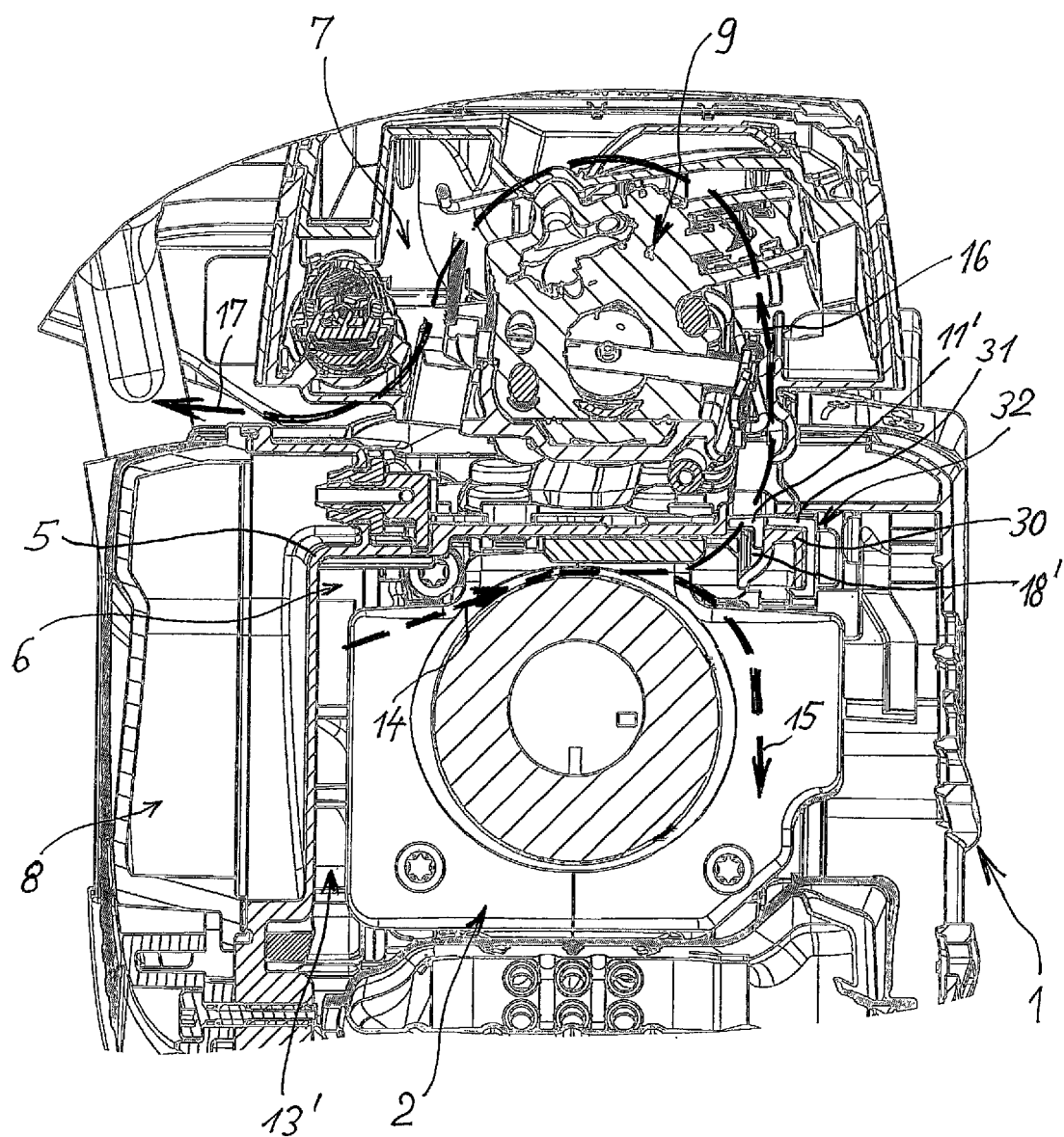
FIG. 7 shows an embodiment alternate to FIG. 1 having a direction arrow of the airflow in winter operation.

In FIG. 7, a combustion engine 2 is built into a housing 1 of a portable work apparatus. The cylinder of the engine 2 is provided with cooling ribs formed thereon. In the housing 1, an intermediate wall 5 extends next to the combustion engine 2. This intermediate wall 5 separates an engine compartment 6 from a carburetor compartment 7, a tank compartment 8 and possibly additional compartments. A carburetor 9 is mounted in the carburetor compartment 7. The carburetor 9 is connected via an intake stub to an inlet opening for the combustion mixture. An opening 11' is disposed in the intermediate wall 5 and a closure element 32 is arranged in the region of this opening.

Figure 9:
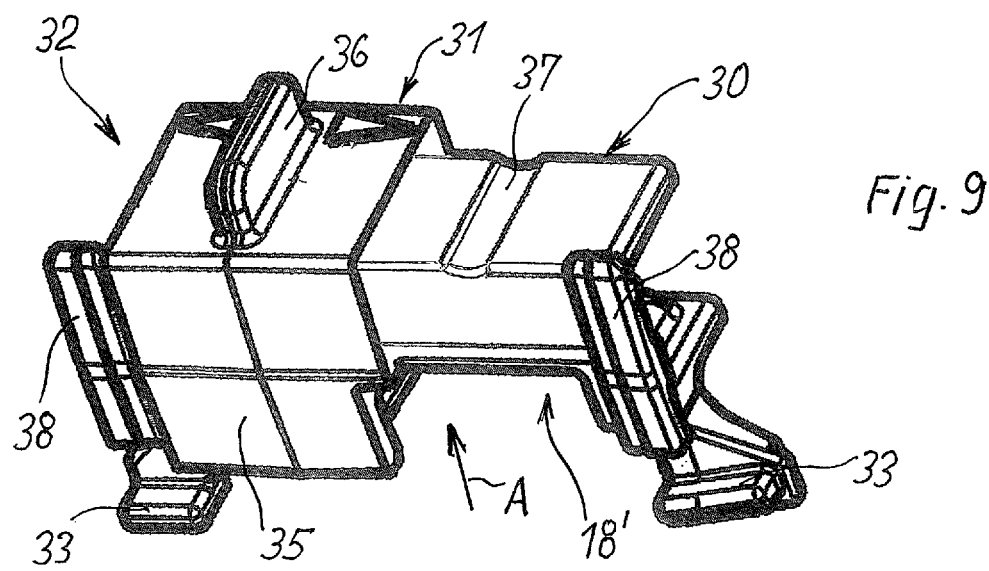
FIG. 9 shows a two-part closure element in a perspective enlarged illustration in the position for the winter operation.
Figure 10:
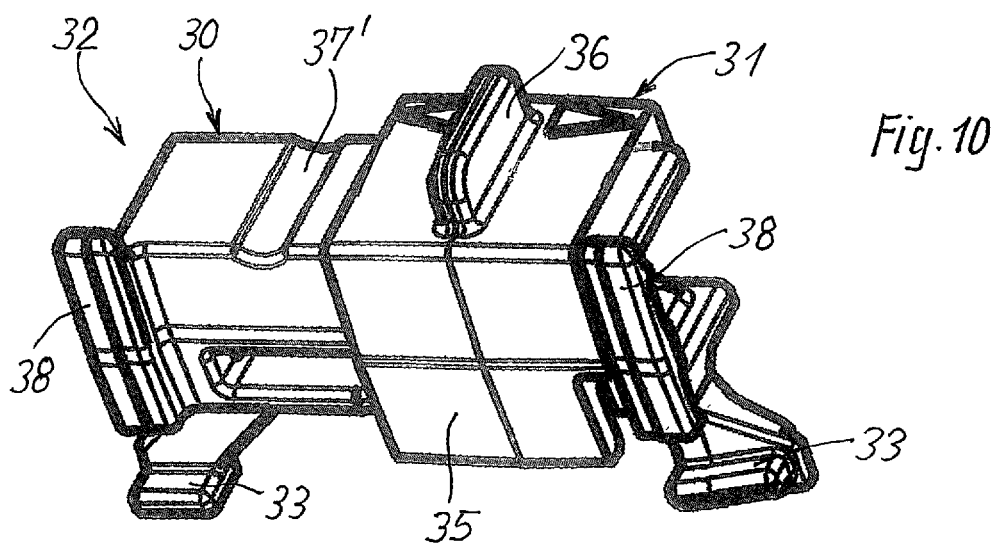
FIG. 10 is a schematic showing the closure element of FIG. 9 in the position for summer operation.

As shown in FIGS. 9 and 10, the closure element 32 comprises two parts, namely, a fixed mount or socket 30 and a slider 31 which is linearly movable to a limited extent on the socket 30. Details with respect hereto will be explained hereinafter. The slider 31 can assume two different positions. In a first position, the opening 11' is cleared and, in a second position, the opening 11' is closed. The position with the cleared opening 11' is characterized as "winter position" and the position with the closed opening 11', is characterized as a "summer position". In FIG. 7, the winter position of the closure element 32 is shown and the opening 11' accordingly cleared. In this way, the engine compartment 6 is fluidly connected to the carburetor compartment 7, that is, air can enter into the carburetor compartment 7 from the engine compartment 6.

The cooling airflow 14 is generated by a fan wheel 13' attached to an engine shaft. The cooling airflow 14 charges the cooling ribs of the combustion engine 2 and flows between cylinder 3 and the intermediate wall 5. The cooling airflow 14 is warmed by radiation of heat at the cooling ribs and impinges upon the closure element 32. A component flow 16 is guided to the opening 11' via a channel 18' formed in the closure element 32 and is guided into the carburetor compartment 7. There, this component flow 16 of warmed cooling air flows about the housing of the carburetor 9 so that a temperature increase takes place and the combustion air, which flows through the carburetor 9, is likewise heated. The component airflow 16 exits from the carburetor compartment 7 as indicated by arrow 17. A part of the cooling airflow 14 is backed up when impinging on the closure element 32 and a component airflow 15 is deflected in the direction which makes possible a charging of the cooling ribs facing away from the fan wheel 13'. In this way, a uniform temperature distribution over the periphery of the cylinder 3 is achieved.

Figure 8:
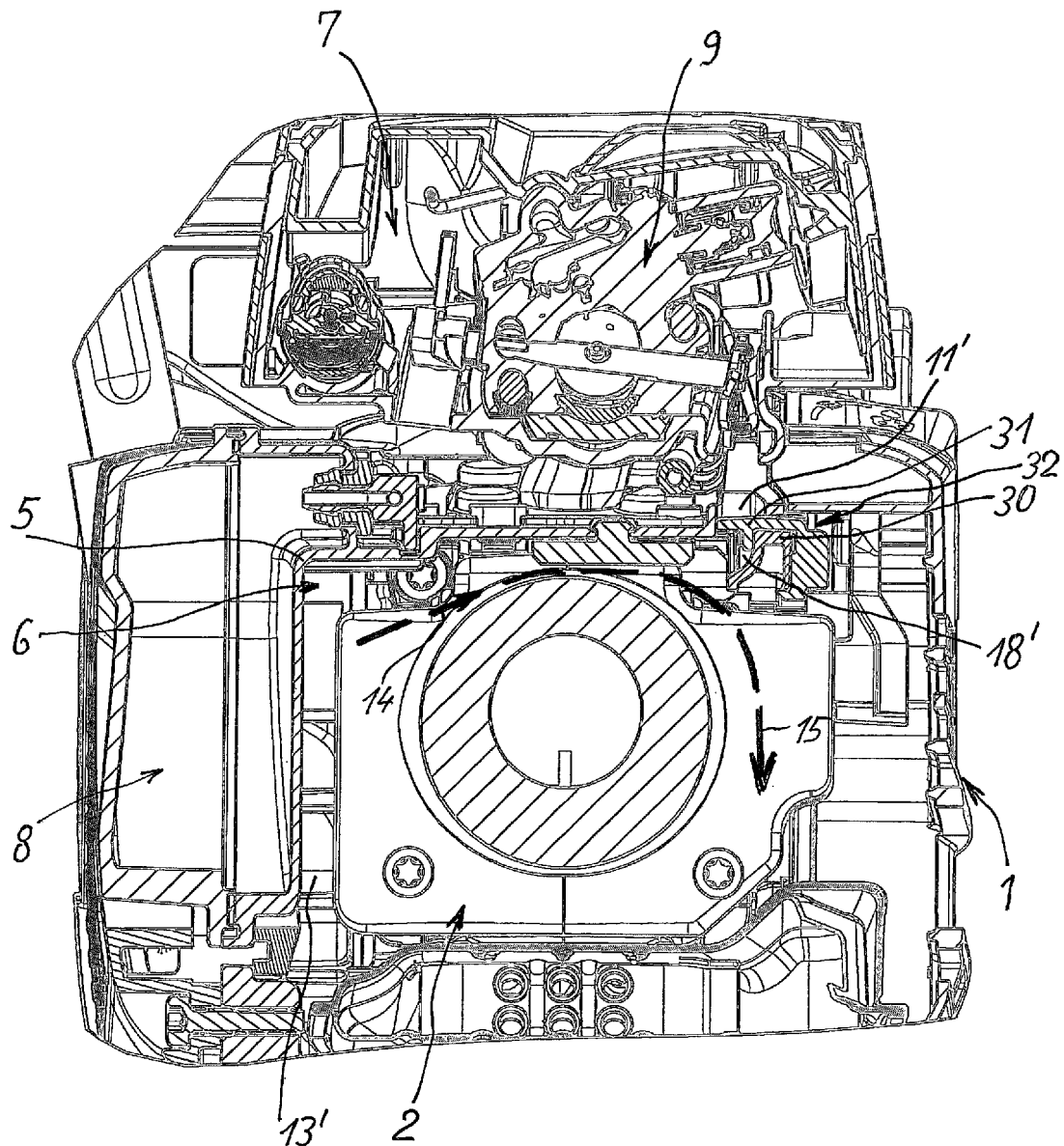
FIG. 8 is a view corresponding to FIG. 7 showing the directional arrow of the airflow in summer operation.

FIG. 8 shows a cutaway of a section through an apparatus as in FIG. 7. However, the slider 31 is in a position, which is displaced orthogonally to the plane of the drawing, namely, in the summer position wherein the opening 11' is closed. In this way, apart from an insignificant leakage flow in the closure element 32, the cooling airflow 14, which is moved by the fan wheel 13', is used in total as an airflow serving to charge the cooling ribs facing away from the fan wheel 13'. This airflow then exits from the apparatus in accordance with arrow 14'. It is noted that the reference numerals of FIG. 8 correspond to those in FIG. 7 for the same parts.

FIG. 9 is an enlarged view of a closure element 32. The closure element comprises a mount or socket 30 and a slider 31. The socket 30 is fixedly mounted on the intermediate wall 5 (see FIG. 7) by attachment hooks 33 and lateral rails 38. FIG. 9 shows the slider 31 on the socket in a left end position whereby a latch section 35 of the slider 31 clears the channel 18' configured in the socket 30 so that air can flow therethrough. This is the "winter position" described with respect to FIG. 7. The inflow direction of air is indicated by arrow A. The slider 31 is provided on its upper side with a handle 36 which serves for shifting the slider 31. In the region above the channel 18', the socket 30 has an elongated recess 37, which runs transversely to the sliding direction of the slider 31, wherein a projection, which is formed on the slider 31, latches so that the slider 31 is held in a defined position against an unwanted or unintentional displacement. The lateral rails 38, which are formed on the socket 30, function to limit the maximum displacement path of the slider 31.

Figure 11:
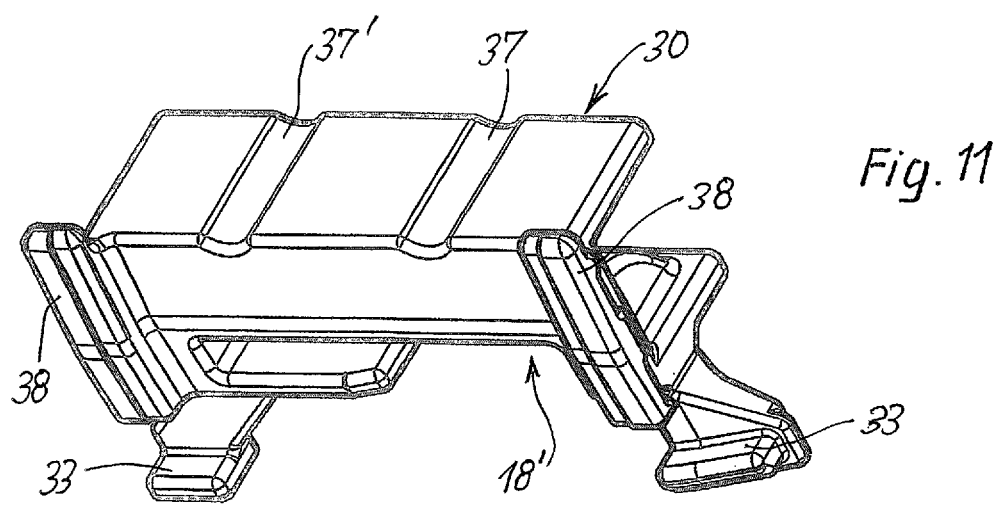
FIG. 11 is a fixed part of the closure element as an individual part.

FIG. 10 shows the closure element 32 according to FIG. 9 in the second position of the slider 31, namely, the "summer position". In this position of the slider 31, the blocking section 35 covers over the channel 18' so that the airflow is deflected and, at most, an insignificant leakage flow passes through the closure element 32. The cutout, which is visible in FIG. 10 on the left side of the socket, is closed by a setback wall configured in the socket 30. In the left region, the socket 30 has a further recess 37' on its upper side. This recess serves the same purpose as the recess 37. The attachment elements 33 and the stops 38 are unchanged. In FIG. 11, the socket 30 of the closure element is shown as a single part. The reference numerals for the same parts correspond to those of FIGS. 9 and 10.

Figure 12:
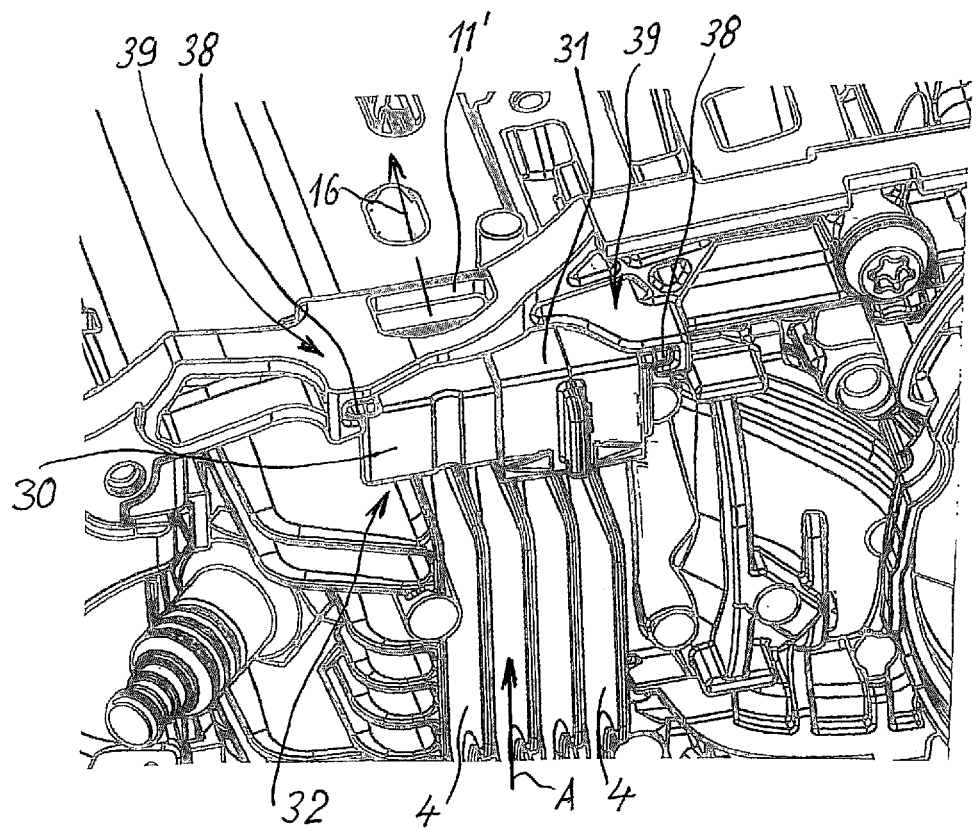
FIG. 12 is a perspective view of the arrangement of the closure element in the engine compartment in the position for winter operation.

FIG. 12 shows an arrangement of the closure element 32 on the intermediate wall in the engine compartment. The opening 11' is provided in the intermediate wall. A holder 39 for accommodating the rails 38 is provided laterally next to the opening 11' on the intermediate wall whereby the closure element 32 is precisely positioned. The airflow, which is warmed by the cooling ribs 4, is guided to the closure element 32 in the direction of arrow A. The slider 31 is disposed in FIG. 12 in the right position on the socket 30 so that the opening 11' is cleared (winter position). The component flow 16 can thereby pass through the opening 11'.

Figure 13:
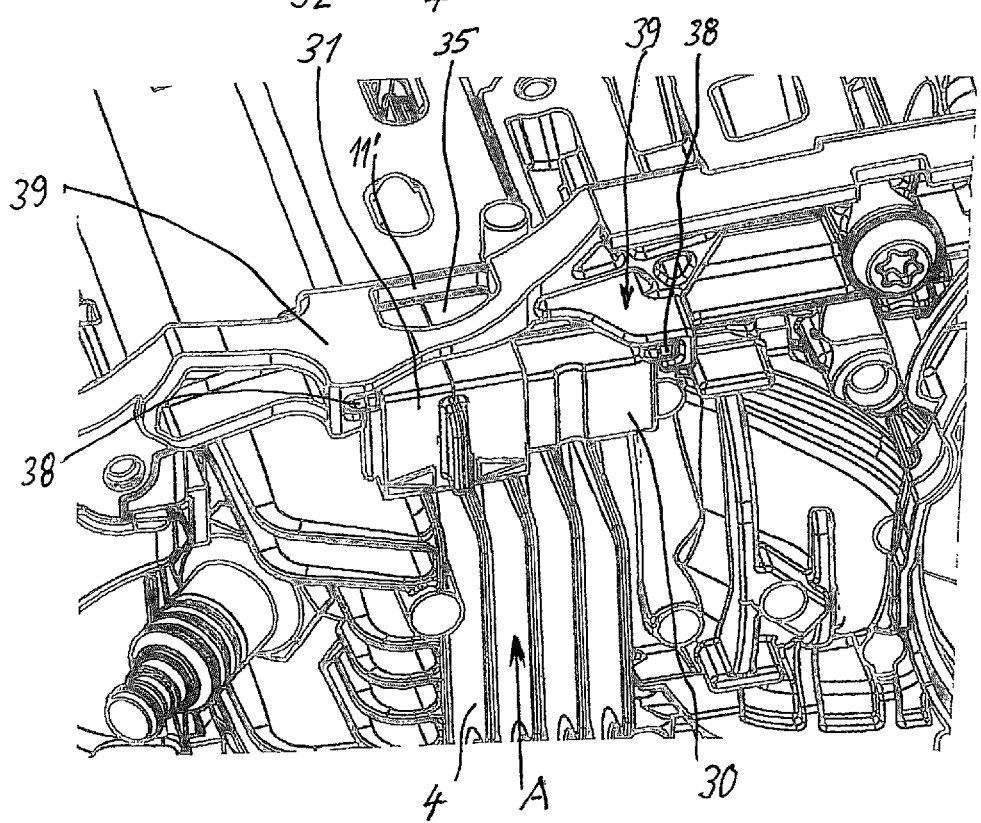
FIG. 13 is a view corresponding to that of FIG. 12 in the position for summer operation.

In FIG. 13, the arrangement according to FIG. 12 is shown in the left position of the slider 31 on the socket 30 so that the blocking section 35 closes the opening 11' The inflowing air according to directional arrow A can thereby not pass through the opening 11'. FIGS. 12 and 13 show that the airflow, which is supplied in accordance with directional arrow A, is not deflected by the slider 31. Instead, this function is provided by the socket 30. The slider 31 closes the channel 18' or clears the same depending upon the assumed position.

Figure 14:
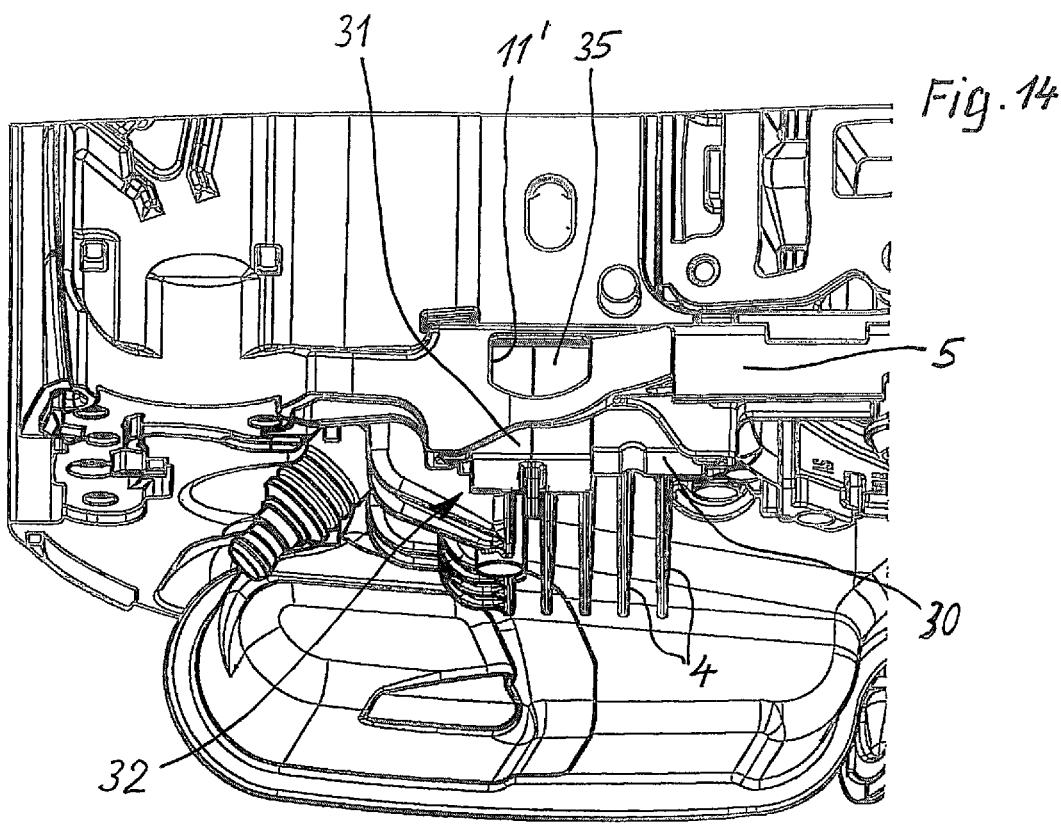
FIG. 14 is a view of the closure element positioned opposite to the inflow direction of the air in the summer position; and, FIG. 15 is a view corresponding to FIG. 14 in the winter position.
Figure 15:
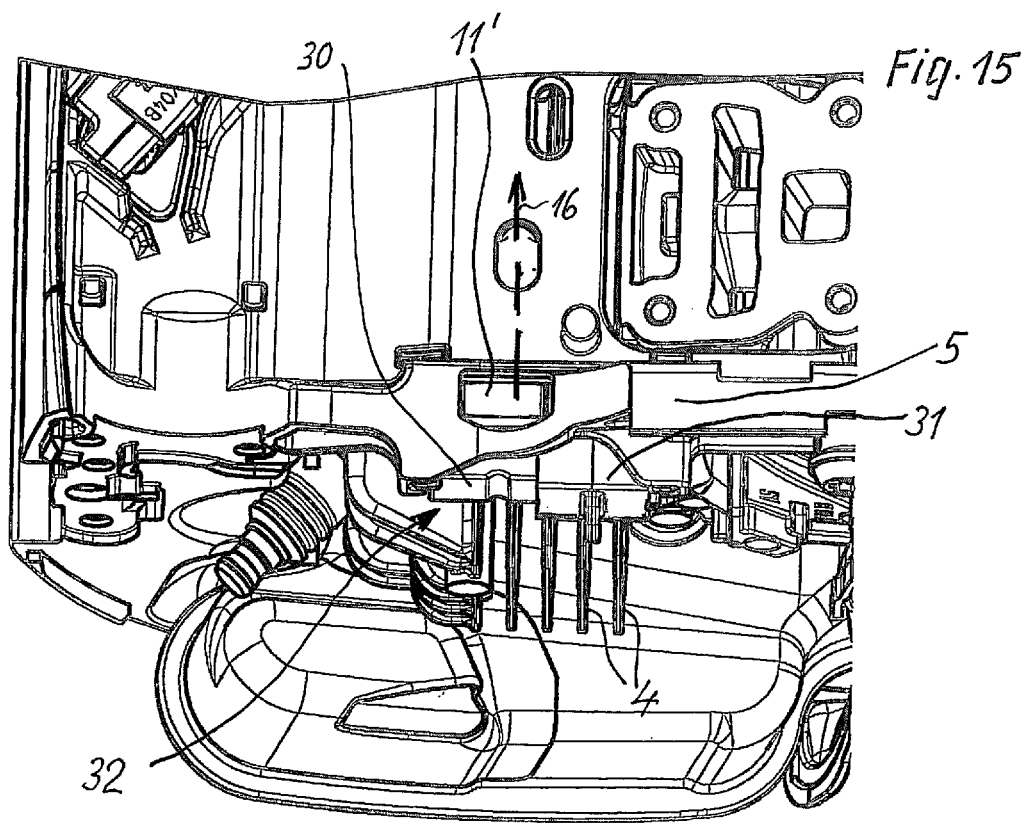

FIG. 14 shows a view of the closure element 32 in the summer position. The airflow, which comes from below from the region of the cooling ribs 4, is hindered to pass through the opening 11' because the slider 31 is disposed in the left position on the socket 30 and therefor the closing section 35 closes the opening 11' in the intermediate wall 5. FIG. 15 shows the closure element 32 in the winter position. The slider is disposed in the right position on the socket 30 so that the opening 11' is cleared and the component flow 16 can flow therethrough.

It is understood that the foregoing description is that of the preferred embodiments of the invention and that various changes and modifications may be made thereto without departing from the spirit and scope of the invention as defined in the appended claims.

What is claimed is:

1. A portable handheld work apparatus comprising:
an internal combustion engine having a cylinder provided with cooling ribs;
a carburetor having a carburetor housing and being operatively connected to said engine;
a fan wheel for generating a cooling airflow passing over said cooling ribs causing said cooling airflow to become a heated cooling airflow;
a housing having an engine compartment for accommodating said engine therein and a carburetor compartment for accommodating said carburetor therein and having an intermediate wall separating said compartments from each other;
an opening passing said heated cooling airflow to said carburetor for temperaturizing said carburetor as may be needed;
a closure element for selectively opening or closing said opening for controlling the heated cooling airflow to said carburetor;
said opening being disposed in said intermediate wall;
said closure element having an air guide wall extending substantially transversely to said heated cooling airflow so as to cause said heated cooling airflow to be at least in part backed up and deflected; and,
said closure element being configured to be in a selectable position so as to cause said heated cooling airflow to be split into a first component of heated cooling airflow configured to flow into said carburetor compartment to there flow about said carburetor housing so as to warm said carburetor housing from the outside thereof and a second component of heated cooling airflow configured to flow toward said cooling ribs.

2. The portable handheld work apparatus of claim 1, wherein said closure element is configured as an insert component.

3. The portable handheld work apparatus of claim 2, wherein said insert component is elongated and has a mid section for selectively closing said opening; and, said insert component further has first and second insert sections for attaching said insert component.

4. The portable handheld work apparatus of claim 3, further comprising receiving fixtures close to said opening into which said insert component can be inserted.

5. The portable handheld work apparatus of claim 4, wherein each of said receiving fixtures defines a slot for accommodating a corresponding one of said insert sections therein.

6. The portable handheld work apparatus of claim 2, wherein said insert component has at least one latch projection; and, wherein said apparatus further comprises a latch hook on said intermediate wall for coacting with said latch projection.

7. The portable handheld work apparatus of claim 3, wherein said insert component has a longitudinal side and an air guide wall on said longitudinal side which extends substantially over the length of said insert component.

8. The portable handheld work apparatus of claim 3, wherein said insert component is selectably mountable with respect to said opening in one of two positions; said insert component has a longitudinal side and a channel on said longitudinal side for conducting said first component heated cooling airflow to said carburetor; and, said channel is in overlapment with said opening in one of said two positions.

9. The portable handheld work apparatus of claim 8, wherein said longitudinal side of said insert component is a first longitudinal side and said insert component has a second longitudinal side next to said channel; and, said insert component further has a short air guide wall arranged next to said channel.

10. A portable handheld work apparatus comprising:
a housing having an intermediate wall partitioning said housing into an engine compartment and a carburetor compartment;
an internal combustion engine mounted in said engine compartment and having a cylinder provided with cooling ribs;
a carburetor operatively mounted in said carburator compartment and being connected to said engine;
said carburetor having a carburetor housing;
a fan wheel for generating a cooling airflow passing over said cooling ribs causing said cooling airflow to become a heated cooling airflow;
an opening formed in said intermediate wall for passing said heated cooling airflow to said carburetor for temperaturizing said carburetor as may be needed;
a closure element for selectively opening or closing said opening for controlling the heated cooling airflow to said carburetor;
said closure element being mounted on said intermediate wall in said en sine compartment;
said closure element having an air guide wall extending substantially transversely to said heated cooling airflow so as to cause said heated cooling airflow to be at least in part backed up and deflected;
said closure element being configured to be in a selectable position so as to cause said heated cooling airflow to be split into a first component of heated cooling airflow to said carburetor to there flow about said carburetor housing so as to warm said carburetor housing from the outside thereof and a second component of heated cooling airflow toward said cooling ribs;
said closure element including a first part in the form of a fixed socket and a second part in the form of a movable slider;
said socket having a channel formed therein which can be cleared or blocked by said slider; and,
said channel being configured to be at least partially disposed in said cooling air flow when said channel is cleared.

11. The portable handheld work apparatus of claim 10, wherein said slider is limitedly linearly movable on said socket.

12. The portable handheld work apparatus of claim 10 wherein said slider has a blocking section formed thereon via which said channel can be closed.

13. The portable handheld work apparatus of claim 10, wherein said socket has attachment hooks and lateral rails arranged thereon for attaching said socket to said intermediate wall.

14. The portable handheld work apparatus of claim 10, wherein said slider has a handle for shifting said slider.

15. The portable handheld work apparatus of claim 10, wherein said socket is said air guide wall and said slider only has the function to block said channel or to clear said channel.

16. The portable handheld work apparatus of claim 10, wherein said socket has two elongated recesses with which said slider can be held in defined positions.

17. The portable handheld work apparatus of claim 10, wherein said socket and said slider are each made of plastic.

18. The portable handheld work apparatus of claim 1, wherein said carburetor is arranged in said carburetor compartment; and, said carburetor compartment is configured to enable said heated cooling airflow to circulate freely therein.

19. A portable handheld work apparatus comprising:
    an internal combustion engine having a cylinder provided with cooling ribs;
    a carburetor having a carburetor housing and being operatively connected to said engine;
    a fan wheel for generating a cooling airflow passing over said cooling ribs causing said cooling airflow to become a heated cooling airflow;
    an opening configured to pass said heated cooling airflow to said carburetor for temperaturizing said carburetor as may be needed;
    a closure element for selectively opening or closing said opening for controlling the heated cooling airflow to said carburetor;
    said closure element having an air guide wall extending substantially transversely to said heated cooling airflow so as cause said heated cooling airflow to be at least in part backed up and deflected; and,
    said closure element being configured to be in a selectable position so as to cause said heated cooling airflow to be split into a first component of heated cooling airflow to said carburetor to there flow about said carburetor housing so as to warm said carburetor housing from the outside thereof and a second component of heated cooling airflow flowing toward said cooling ribs;
    said air guide wall being at least partially disposed in said cooling airflow in every one of said selectable positions of said closure element;
    an intermediate wall defining a plane;
    said closure element being configured as an insert component;
    receiving fixtures formed laterally next to said opening and running parallel to said plane;
    said receiving fixtures defining mutually opposite-lying slots; and,
    said insert component being configured to be insertable into said receiving fixtures.

* * * * *

UNITED STATES PATENT AND TRADEMARK OFFICE
CERTIFICATE OF CORRECTION

| | | |
|---|---|---|
| PATENT NO. | : 9,016,246 B2 | Page 1 of 1 |
| APPLICATION NO. | : 13/458756 | |
| DATED | : April 28, 2015 | |
| INVENTOR(S) | : J. Kurzenberger et al. | |

It is certified that error appears in the above-identified patent and that said Letters Patent is hereby corrected as shown below:

In the Claims,

In column 8:
Line 48: delete "en sine" and substitute -- engine -- therefor.

In column 10:
Line 9: insert -- to -- after "as".

Signed and Sealed this
Eleventh Day of August, 2015

Michelle K. Lee
*Director of the United States Patent and Trademark Office*